June 27, 1939. J. O. LOGAN 2,163,793
PRODUCTION OF CHLORINE DIOXIDE
Filed June 8, 1937
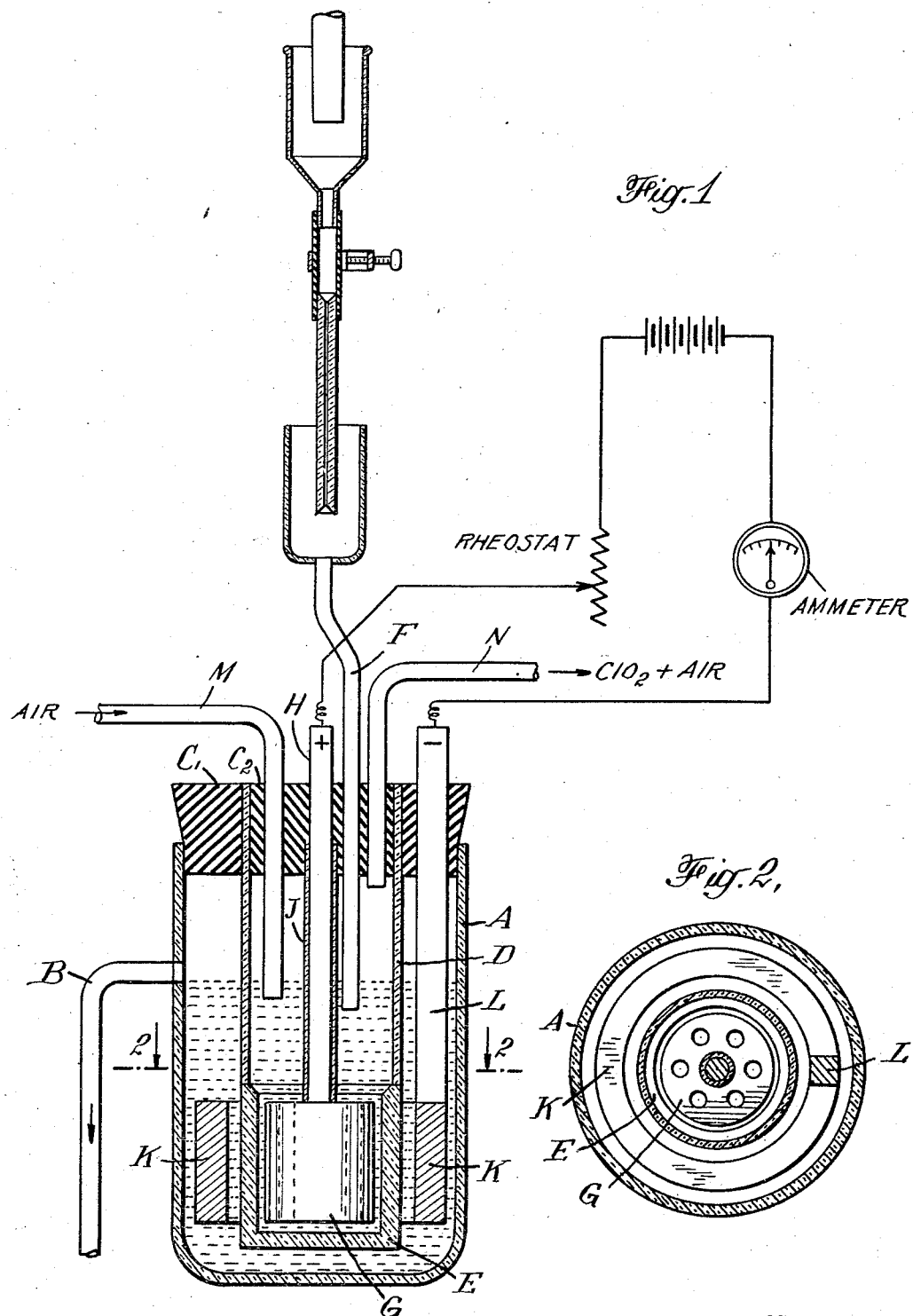
INVENTOR
John Ogden Logan
BY
Pennie, Davis, Marvin & Edmonds
ATTORNEYS Patented June 27, 1939

2,163,793

UNITED STATES PATENT OFFICE 2,163,793

PRODUCTION OF CHLORINE DIOXIDE

John Ogden Logan, Niagara Falls, N. Y., assignor to The Mathieson Alkali Works, Inc., New York, N. Y., a corporation of Virginia Application June 8, 1937, Serial No. 146,984

4 Claims. (Cl. 204—9)

This invention relates to an electrolytic process for the production of chlorine dioxide completely free of chlorine at a controlled and uniform rate.

According to the highly economical process of my invention, a controlled amount of chlorine free chlorine dioxide is produced at a uniform rate by the electrolysis of a solution containing a chloride of an alkali or alkaline earth metal and a chlorite of the same or other alkali or alkaline earth metal. In my process it is possible by the simple expedient of regulating the electric current supplied to the apparatus to control the production of $ClO_2$. There is no gaseous chlorine used or produced at any time during the process. This is a decided advantage inasmuch as chlorine dioxide is used in certain operations such as, for example, the treatment of flour, where the presence of even a small amount of chlorine as a contaminant renders it unfit for use. My process is equally successful when either a small, compact, portable apparatus or a large scale commercial unit is employed. An efficient electrolytic apparatus can be constructed which is equal to in efficiency but smaller and more compact than the minimum size of any other apparatus for producing $ClO_2$. A further advantage is the fact that the handling of acids and liquid or gaseous chlorine is eliminated.

I have found that if a solution containing the chlorite and the chloride of an alkali or alkaline earth metal is electrolyzed, chlorine dioxide gas is liberated at the anode. Hydrogen gas is liberated at the cathode, and the solution surrounding the cathode becomes alkaline. The chloride concentration remains substantially constant during the electrolysis. The overall reaction which occurs during the process may be represented by the following equation:

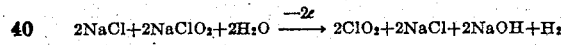

$$2NaCl + 2NaClO_2 + 2H_2O \xrightarrow{-2e} 2ClO_2 + 2NaCl + 2NaOH + H_2$$

The above reaction for the production of chlorine free $ClO_2$ in a specially developed electrolytic cell hereinafter more fully described, I have found to be very efficient and economical. I am unable to explain or recite the entire course of the reaction and do not, therefore, base my invention on any theory dealing with the mechanism of the reaction or any intermediate substances which may be formed. I present the following as a purely theoretical explanation of the course of the reaction. The chloride, for example NaCl, used in the above equation, which is present in excess in the electrolytic cell is electrolyzed. The chloride ion will migrate to the anode and the sodium ion to the cathode. With the migration of the $Na^+$ to the cathode as is usual in such cases, hydrogen is liberated and the catholyte becomes alkaline due to the formation of NaOH. At the anode, however, contrary to the usual result of electrolyzing NaCl, there is no evidence of the formation of an gaseous $Cl_2$. It has been proposed to produce gaseous $ClO_2$ by treating the chlorite of the class consisting of the chlorites of the alkali metals and the alkaline earth metals with gaseous chlorine in Cunningham and Losch Patent No. 2,043,284. It seems reasonable to postulate, therefore, that in the present reaction the chloride ion is discharged at the anode, and that the thus formed atomic chlorine immediately oxidizes the $ClO_2^-$ of the $NaClO_2$ or other chlorite which is in the surrounding solution, to molecular gaseous $ClO_2$. Simultaneously, with this oxidation the atomic chlorine would itself be reduced back to chloride ion. The formed chlorine dioxide is then removed from the solution by a stream of air or other inert gas, thus eliminating the danger of forming explosive mixtures of chlorine dioxide and air in cases where air is used as the stripping agent, or of building up dangerous concentrations of $ClO_2$ in the solution.

The process of my invention is most advantageously carried out in an electrolytic cell in which the anode compartment and cathode compartment are separated by a porous diaphragm. The details of the process may best be understood by a consideration of an apparatus suitable for carrying out the reaction to produce chlorine dioxide by my electrolytic method. A typical small scale laboratory apparatus which may be successfully employed is illustrated in the accompanying drawing of which Fig. 1 is a vertical section of a suitable electrolytic cell with diagrammatically indicated electric connections; and Fig. 2 is a horizontal section of Fig. 1 along the line 2—2.

An aqueous solution of a chlorite and a chloride of an alkali or alkaline earth metal is first run into a glass electrolytic cell A to a level even with the overflow pipe B. The concentration of this initial solution and also of the subsequently added feed solution with respect to chlorite and chloride may vary as hereinafter more fully explained. The electrical elements of the cell, together with inlet pipes for the stripping gas and the feed liquor and an outlet for the chlorine dioxide-stripping gas mixture pass through and are supported by a stopper which renders the cell gas tight. In a small scale apparatus such as is here illustrated, this may conveniently be a properly drilled rubber stopper or two concentric rubber stoppers C₁ and C₂. This cell is divided into two concentric sections by means of a cylindrical anode cup D, the upper portion of which should be a glass tube and the lower portion (E) a fritted diaphragm of the same diameter. The feed solution containing the chlorite and chloride is introduced at a controlled rate into the anode compartment through an inlet tube F which extends below the surface of the anolyte solution. The anode G is designed in a manner to provide a large surface area and has vertical holes drilled through it to increase the surface and also to prevent any of the generated gas from being trapped on the bottom surface of the electrode. The vertical riser portion of the anode H is enclosed in a glass tube J which extends below the surface of the liquid and prevents the liberation of gaseous chlorine at the surface. The ring cathode K is supported by a post L which passes through the stopper and is connected with the negative side of the source of the electrolyzing current. In order to remove the generated $ClO_2$ from the cell, air or other inert gas is introduced below the surface of the liquid by means of tube M opening into the liquid at a point above the exposed surface of the anode. The resulting gaseous mixture containing the inert gas and the $ClO_2$ is removed through the outlet tube N.

While the concentration of chlorite in the feed solution may vary over wide limits, I have found that in practical operation it is most advantageous to employ a solution concentrated with respect to chlorite, there being no upper limit except, of course, the solubility of the particular chlorite used. With the proper regulation of speed of flow of feed and current density the chlorite introduced into the cell is substantially completely oxidized to $ClO_2$. It is obvious, that while in my preferred method of operation I employ concentrated chlorite solutions, the present process also affords a means whereby liquors containing small quantities of chlorite may be treated, thus recovering valuable oxidized chlorine values in the form of chlorine dioxide, when their recovery in the form of chlorite would be impractical or even impossible.

The solution with which the cell is charged at the start of an operation should be high in chloride concentration, the molar proportion of chloride exceeding the molar proportion of chlorite present. The feed solution which is subsequently introduced into the cell may contain no chloride, or it may vary in chloride concentration from a molar proportion very small with respect to the molar proportion of chlorite of the feed solution up to a concentration such as is originally charged to the cell as above described. An excess chloride concentration is maintained in the cell in order to eliminate the possibility of directly electrolyzing the chlorite solution, thus producing undesirable products and poor efficiencies. Having once initiated the reaction and properly regulated the flow so that the chlorite introduced is completely oxidized, the chloride ion in the anode compartment remains substantially constant, very little being lost in the overflow from the cathode compartment. As a precaution, however, it is advisable to maintain some chloride in the feed solution, at least as a minor constituent.

The method of supplying the feed solution to the cell may be any convenient one as determined by the desired rate of flow. For small flows in laboratory scale cells, the use of a calibrated capillary supplied by a stock bottle is a satisfactory expedient. For larger flows, such as would be necessary in larger cells, any one of the standard methods for metering liquids is satisfactory such as, for example, an adjustable valve and liquid flow-meter, or a solenoid valve controlled by the current flow through the cell.

The electrodes to be used in the electrolytic cell may be made of any suitable conducting material. On small scale cells graphite is frequently employed due to the convenience of machining. On larger units, however, other conducting materials are usually preferred due to the fragile nature of the carbon. Nickel and copper have proven to be satisfactory for such a purpose. Nickel possesses the added advantage that it is quite resistant to the hydroxyl ion which is produced at the cathode. In a large unit which may have a capacity of 25–30 times that of a small scale cell such as is illustrated in Figs. 1 and 2 or even greater, the electrodes may be of different shapes, and also may with advantage contain a cooling coil within or around the anode in order to keep the temperature of the solution in the cell below about 40° C.

The diaphragm which separates the anode and the cathode compartments may be made of any suitable material which is sufficiently porous to permit a satisfactory flow of solution without allowing any substantial amount of diffusion from one compartment to another. In a small laboratory unit a satisfactory device has been found to be a sintered glass cup made of 20–40 mesh ground glass the walls of which are approximately ½ in. in thickness. Other materials, such as for example alundum, aloxite, or asbestos are also satisfactory for this purpose.

The following examples of operation are presented as illustrative of the operation of a small scale cell. In these examples a cell of approximately 400 cc. charging capacity was employed.

*Example I*

A cell containing a carbon anode and a copper cathode was charged and subsequently fed at the rate of 2.30 cc. per minute, with a solution containing 144 grams per liter $NaClO_2$ and 140 grams per liter $NaCl$. A current of 5.0 amperes was passed through the cell and the air flow was 1.95 liters per minute. Gas samples were analyzed at frequent intervals. The results obtained are summarized in the following table.

| Time (minutes from start) | Voltage | Grams $ClO_2$ per hour | Partial pressure $ClO_2$ | $ClO_2$ evolved chlorite input |
|---|---|---|---|---|
| | | | | Per cent |
| 35 | 3.3 | 9.40 | 19.5 | 71.4 |
| 50 | 3.4 | 9.73 | 20.1 | 73.9 |
| 65 | 3.3 | 9.45 | 19.6 | 71.8 |
| 80 | 3.3 | 9.52 | 19.8 | 72.4 |
| 95 | 3.3 | 9.45 | 19.6 | 71.8 |
| 110 | 3.3 | 9.33 | 19.3 | 70.8 |
| Averages | | 9.48 | 19.6 | 72.0 |

*Example II*

A cell containing a carbon anode and nickel cathode was charged and subsequently fed at the rate of 2.30 cc. per minute with a solution containing 144 grams per liter $NaClO_2$ and 140 grams per liter $NaCl$. A current of 7.0 amperes was passed through the cell and the air flow was 1.95 liters per minute. Gas samples were analyzed at frequent intervals. The results obtained are summarized in the following table:

| Time (minutes from start) | Voltage | Grams ClO₂ per hour | Partial pressure ClO₂ | ClO₂ evolved chlorite input |
|---|---|---|---|---|
| | | | | Per cent |
| 30 | 5.1 | 9.95 | 24.2 | 75.6 |
| 45 | 5.1 | 9.60 | 23.3 | 72.9 |
| 60 | 5.1 | 9.80 | 23.8 | 74.5 |
| 75 | 5.1 | 9.32 | 22.6 | 70.9 |

As a result of the efficiency and compactness of a cell suitable for the production of chlorine dioxide as herein described, a small portable unit may be constructed which for some purposes will prove highly advantageous. I have constructed such a unit in which the entire apparatus with all accessories was included in a case 6 in. x 6 in. x 30 in. The front of the case is removable and the sides open back on hinges. Flowmeters are suspended on these sides. The cell, and feed supply are supported on brackets attached to the back of the case. The rheostat and ammeter are enclosed in a small compartment at the bottom.

I claim:

1. A process for producing chlorine dioxide free of chlorine which comprises electrolyzing an aqueous solution having dissolved therein a chlorite of the class consisting of the chlorites of the alkali metals and the alkaline earth metals, and a molar proportion of a chloride of the class consisting of the chlorides of the alkali metals and the alkaline earth metals in excess of the molar proportion of the chlorite present.

2. A process for producing chlorine dioxide free of chlorine which comprises continuously supplying a controlled quantity of an aqueous solution containing a chlorite of the class consisting of the chlorites of the alkali and alkaline earth metals, and a molar proportion of a chloride of the class consisting of the chlorides of the alkali and alkaline earth metals in excess of the molar proportion of the chlorite present in the solution, to the anode compartment of an electrolytic cell; electrolyzing the solution; stripping the generated chlorine dioxide from the anolyte solution by means of an inert gas prior to the passage of the solution through a porous diaphragm into the cathode compartment; removing the produced chlorine dioxide admixed with the introduced inert gas; and continuously removing the catholyte solution and formed hydrogen from the cathode compartment.

3. A process for producing chlorine dioxide free of chlorine which comprises charging an electrolytic cell with an aqueous solution containing a chlorite of the class consisting of the chlorites of the alkali and alkaline earth metals, and a molar proportion of a chloride of the class consisting of the chlorides of the alkali and alkaline earth metals in excess of the molar proportion of the chlorite present; electrolyzing the solution; continuously supplying a controlled quantity of an aqueous solution containing a chlorite of the class consisting of the chlorites of the alkali and alkaline earth metals and a molar proportion of a chloride of the class consisting of the chlorides of an alkali and alkaline earth metals substantially less than the molar proportion of the chlorite present in the solution, to the anode compartment during the course of the electrolysis; stripping the generated chlorine dioxide from the anolyte solution by means of an inert gas prior to the passage of the solution through a porous diaphragm into the cathode compartment; removing the produced chlorine dioxide admixed with the introduced inert gas; and continuously removing the catholyte solution and formed hydrogen from the cathode compartment.

4. A process for producing chlorine dioxide free of chlorine which comprises charging an electrolytic cell with an aqueous solution containing a chlorite of the class consisting of the chlorites of the alkali and alkaline earth metals, and a molar proportion of a chloride of the class consisting of the chlorides of the alkali and alkaline earth metals in excess of the molar proportion of the chlorite present; electrolyzing the solution; continuously supplying a controlled quantity of an aqueous solution containing a chlorite of the class consisting of the chlorites of the alkali and alkaline earth metals to the anode compartment during the course of the electrolysis; stripping the generated chlorine dioxide from the anolyte solution by means of an inert gas prior to the passage of the solution through a porous diaphragm into the cathode compartment; removing the produced chlorine dioxide admixed with the introduced inert gas; and continuously removing the catholyte solution and formed hydrogen from the cathode compartment

JOHN OGDEN LOGAN.